United States Patent [19]

Guzik

[11] Patent Number: 4,710,686
[45] Date of Patent: Dec. 1, 1987

[54] METHOD AND APPARATUS FOR CONTROL OF CURRENT IN A MOTOR WINDING

[75] Inventor: Nahum E. Guzik, Mt. View, Calif.

[73] Assignee: Guzik Technical Enterprises, Sunnyvale, Calif.

[21] Appl. No.: 892,109

[22] Filed: Aug. 4, 1986

[51] Int. Cl.$^4$ .............................................. H02P 1/22
[52] U.S. Cl. .................................... 318/293; 318/599; 363/98
[58] Field of Search ............... 318/281, 287, 288, 289, 318/291, 293, 294, 599; 363/17, 98, 132, 136

[56] References Cited

U.S. PATENT DOCUMENTS

| | | | |
|---|---|---|---|
| 4,163,931 | 8/1979 | Seitz et al. ....................... | 318/599 X |
| 4,306,181 | 12/1981 | Welburn .......................... | 318/599 X |
| 4,368,414 | 1/1983 | Watanabe et al. ............... | 318/599 X |
| 4,490,796 | 12/1984 | Bigbie et al. .......................... | 364/519 |
| 4,514,666 | 4/1985 | Suzuki ................... | 318/293 |

FOREIGN PATENT DOCUMENTS

58-69492 4/1983 Japan ................................... 318/599

Primary Examiner—William M. Shoop, Jr.
Assistant Examiner—Bentsu Ro
Attorney, Agent, or Firm—Harry E. Aine

[57] ABSTRACT

A current driver circuit for an inductive load, such as a motor winding, provides unidirectional, controlled current through the winding by use of two pulse width modulator switches on opposite sides of the winding or bidirectional current control by use of two pairs of pulse width modulated switches; each pair straddling the winding relative to the power supply. Each pair of switches is modulated in two different modes to control current during two different operating conditions. The first mode of modulation is used for all but rapidly decaying winding current conditions and a second mode provides control for rapidly decaying winding current. In the first mode, unidirectional current to the winding from the power supply is pulse width modulated while the companion switch of the pair is on. In the second mode of operation for rapidly decaying current control, current from the power supply to the winding is shut off by one switch while the companion switch is pulse width modulated to cyclically switch winding, circulating current back through the power supply in the reverse direction to allow rapid decay of the circulating current. In this manner, increased efficiency is obtained while reducing electromagnetic interference.

10 Claims, 13 Drawing Figures

| INPUTS | | | SWITCH POSITIONS | | | |
|---|---|---|---|---|---|---|
| CURRENT POLARITY COMMAND | A PWM | B PWM | SWITCH 20 | SWITCH 14 | SWITCH 18 | SWITCH 16 |
| 1 | 1 | 0 | ON | ON | OFF | |
| 1 | 0 | 1 | OFF | OFF | | |
| 1 | 0 | 0 | OFF | ON | | |
| 0 | 1 | 0 | OFF | | ON | ON |
| 0 | 0 | 1 | | | OFF | OFF |
| 0 | 0 | 0 | | | OFF | ON |

FIG. 9

| PRESENT MODE | ACTIVITY SENSE | | NEXT MODE |
|---|---|---|---|
| | A ACTIVE | -B ACTIVE | |
| A | "HIGH" | * | A |
| A | "LOW" | "LOW" | B |
| B | * | "LOW" | B |
| B | "HIGH" | "HIGH" | A |
| * | "LOW" | "HIGH" | * |

FIG. 11    * INDICATES A "DON'T CARE" CONDITION

METHOD AND APPARATUS FOR CONTROL OF CURRENT IN A MOTOR WINDING

BACKGROUND OF THE INVENTION

The present invention relates to control of current in an inductive load, and more particularly, to a pulse width modulated driver for controlling the current in a winding of a motor.

DESCRIPTION OF THE PRIOR ART

In motor control, it is often desired to control the level of current in the motor windings to thereby control torque, acceleration, velocity, or position of the shaft, and, consequently, of the mechanical system driven by the motor. Pulse width modulation (PWM) is the method often used for controlling winding current.

Bi-directional current control is often required and, is commonly accomplished with a bridge configuration of four pulse width modulated (PWM) switches of the type shown in FIG. 1 and as disclosed in U.S. Pat. Nos. 4,490,796 and 1,368,414. The bridge includes four electronic switches SW1, SW2, SW3, and SW4, which are on when a logic "high" level is applied to their pole terminals, and four diodes D1, D2, D3, and D4, oppositely poled to the driven direction of current flow. The lower left switch SW1 is controlled by the control signal CURRENT DIRECTION COMMAND and the lower right switch SW2 is controlled by that signal after it is inverted by an inverter INV1. The upper right-hand switch SW4 is controlled by the output signal of an AND gate G1 whose two inputs are connected to the output of a comaprator COMP1 and the CURRENT DIRECTION COMMAND signal respectively. The upper left-hand switch SW3 is controlled by the output signal of an AND gate G2 whose two inputs are connected to the outputs of comparator COMP1 and inverter INV1 respectively. Comparator COMP1 compares the voltage level of a triangular wave generated by a TRIANGULAR WAVE GENERATOR with the output level of an integrating current error amplifier AMP1 which amplifies the difference between the voltage levels of the control signal CURRENT MAGNITUDE COMMAND and the motor winding current level sampled by a resistor Rf and smoothed by an imperfect integrator INT. The motor winding is illustrated by a winding inductance Lm and a winding resistance Rm.

In order for the winding current to flow from right to left, the control signal CURRENT DIRECTION COMMAND is set high. This results in turning on switch SW1, and turning off switches SW2 and SW3, and in setting of switch SW4 into the chopping or (PWM) mode. In the PWM mode, switch SW4 is being alternately turned on and off in accordance with the output level of comparator COMP1 by way of AND gate G1. The frequency of the chopping output signal of gate G1 is that of the triangle wave mentioned above, and the duty cycle is determined by the voltage level of the current error command. More specifically, the closer that voltage level is to the peak amplitude of the triangular wave, the lower the duty cycle.

When switch SW4 is on in this PWM mode, it connects the right hand side of the motor winding to the positive supply +V as shown in FIG. 2. In this configuration energy is being added to the winding resulting in exponentially increasing winding current Iw.

When the switch SW4 is off in the PWM mode, it connects the right hand side of the motor to ground by way of diode D2 as shown in FIG. 3. In this configuration, current "free wheels", i.e., circulates through the winding and the energy is being depleted from the circuit due to losses, resulting in an exponentially decreasing winding current Iw.

By controlling the duty cycle of the signal that turns on and off switch SW4, the operation of the motor driver of Fig. 1 generally results in the winding current Iw closely following the control signal CURRENT MAGNITUDE COMMAND as illustrated in the CONTROLLED WINDING CURRENT portion of FIGS. 4A, B, and C. However, when the desired rate of decay of the winding current exceeds the natural rate of decay obtained by connecting the right hand side of the winding to ground by way of diode D2, the apparatus of FIG. 1 fails to control the winding current, as illustrated in the UNCONTROLLED CURRENT DECAY portion of FIG. 4A. Switch SW4 remains open (UNCONTROLLED CURRENT DECAY portion of FIG. 4B) and the winding current flows through diode D2 (UNCONTROLLED CURRENT DECAY portion of FIG. 4C).

Another type of bridge motor driver is illustrated in FIG. 5 and is disclosed in U.S. Pat. No. 4,163,931 and in the Unitrode Corp. 1985–1986 Semiconductor Databook, page 2–9. This driver comprises four unidirectional electronic switches SW1A, SW2A, SW3A, and SW4A and four diodes D1A, D2A, D3A, and D4A, as in the circuit of FIG. 1. The upper right-hand switch SW4A and the lower left-hand switch SW1A are controlled by the positive output of comparator COMP2 and the upper left-hand switch SW3A and the lower right-hand switch SW2A are controlled by the negative output of a comparator COMP2. Comparator COMP2 compares the voltage level of a triangular wave generated by a TRIANGULAR WAVE GENERATOR with the output level of an integrating current error amplifier AMP3 which amplifies the difference between the voltage levels of the control signal CURRENT COMMAND and the motor winding current sampled by resistors Rf1 and Rf2 and differentially amplified by an integrating amplifier AMP2.

The output signals of comparator COMP2 turn on and off the two diagonally opposed pairs of switches in unison. Assuming the winding current flowing from right to left, when switches SW4A and SW1A are turned on, the current flows from the positive power supply +V through switch SW4A, through the winding, through switch SW1A, through resistor Rf1 to ground. When switches SW4A and SW1A are turned off, the current "free wheels" or circulates from the ground terminal through resistor Rf2, through diode D2A, through the motor winding, through diode D3A and through the power supply +V in the reverse direction, resulting in a rapid decay of the winding current. Energy is thus alternately added to and subtracted from the winding circuit thereby resulting in winding current control.

The motor-driven circuit can follow rapidly decaying portions of a command waveform. It can control decay but it has an attendant disadvantage in that the continuously alternating direction of the current flow through the positive power supply +V results in considerable loss reducing overall circuit efficiency and resulting in a high level of electromagnetic interference (EMI).

It is desired to obtain a motor driver circuit which can follow rapidly decaying portions of a command waveform and yet be reasonably efficient and not introduce excessive EMI.

SUMMARY OF THE PRESENT INVENTION

The principal object of the present invention is to provide a motor winding current driver which can control motor winding current precisely during rapidly decaying portions of a command waveform while providing reasonable efficiency and having reduced EMI.

In one feature of the present invention, unidirectional current through the motor winding (inductive load) is controlled, in a first mode, to follow a command waveform during all but rapid decay portions by controlling switches (current modulators) on opposite sides of the motor winding such that one switch is on and the other pulse width modulated on and off. During rapidly decaying portions of the command waveform, the switches are controlled in a second mode wherein the winding is switched off from the power supply in the forward direction by one of the switches and the other switch is pulse width modulated on and off to divert controlled amounts of winding, "free wheeling" or circulating current back through the power supply so as to achieve the desired rapid decay of the winding current, whereby control is obtained with improved efficiency and reduced EMI.

In another feature of the present invention, a loss of control sensing circuit senses when operation in the first mode can no longer maintain control and switches operations to the second mode.

In another feature of the present invention, the sensing circuit for sensing loss of control during rapidly decaying portions of the command waveform includes an activity sensor for sensing when the current modulation drops below a certain threshold level.

Other features and advantages of the present invention will become apparent upon a perusal of the following specification taken in connection with the accompanying drawings wherein:

BRIEF DESCRIPTION OF THE DRAWINGS

FIG. 9 is a truth table for the circuit of FIG. 8, FIG. 11 is a truth table for the mediation circuit portion of the circuit of the present invention.

DESCRIPTION OF THE PREFERRED EMBODIMENTS OF THE PRESENT INVENTION

Figure 1:
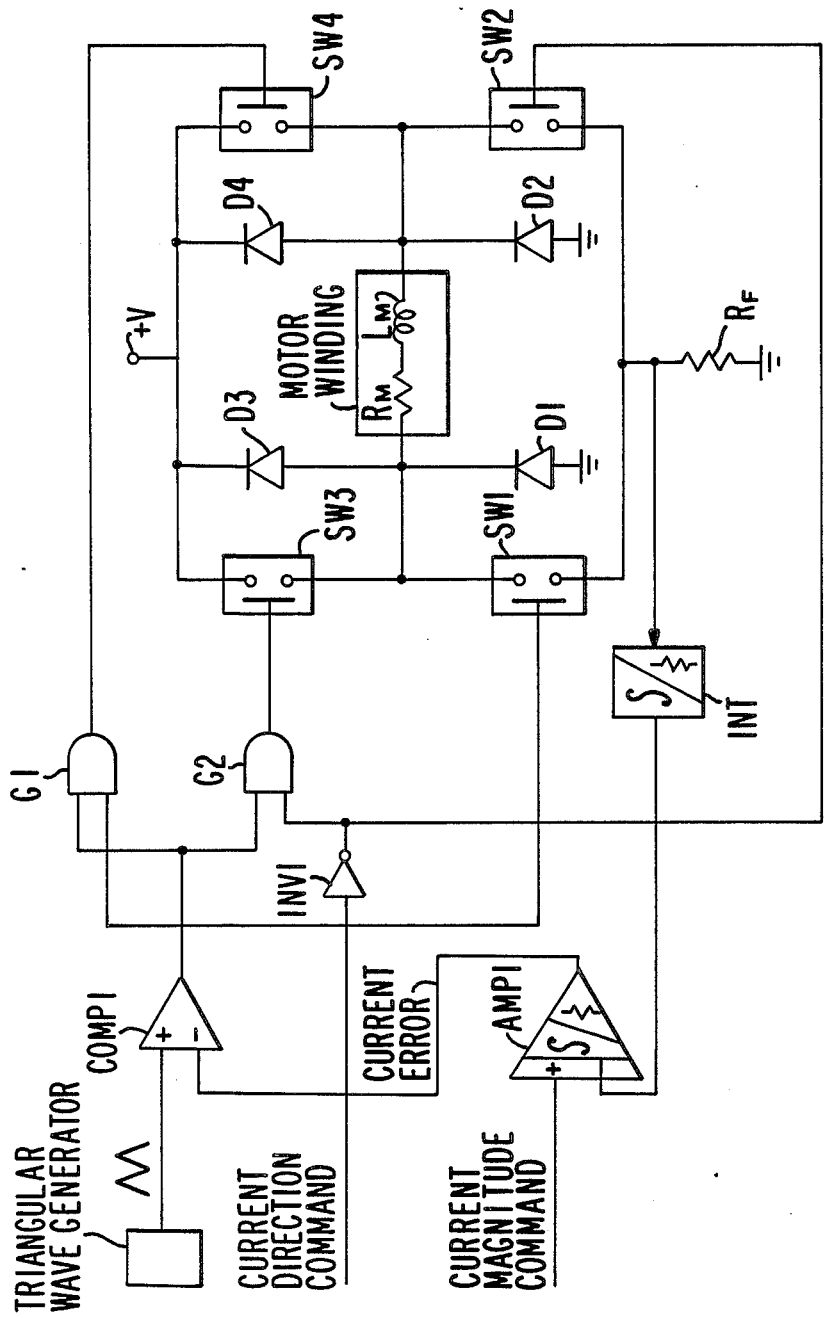
FIG. 1 is a schematic circuit diagram, partly in block diagram form, of a prior art pulse width modulated motor driver.
Figure 2:
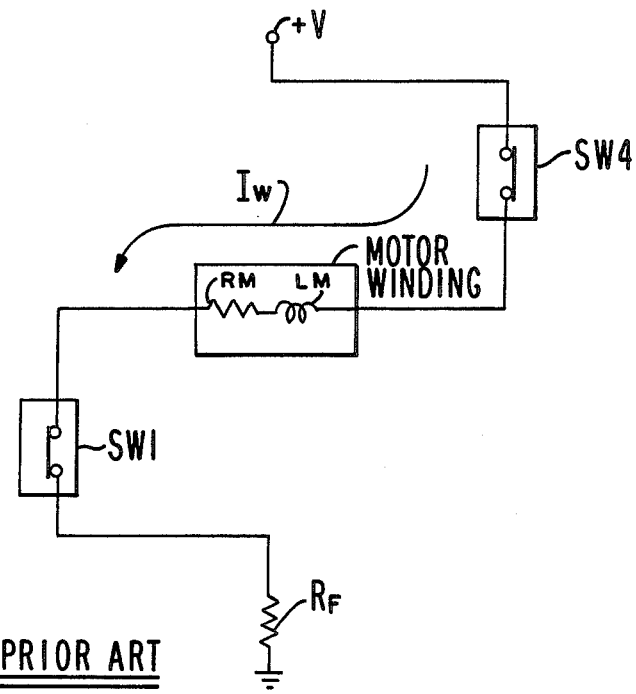
FIG. 2 is a schematic circuit diagram of a portion of the circuit of FIG. 1 depicting current flow during current build-up in the winding.
Figure 3:
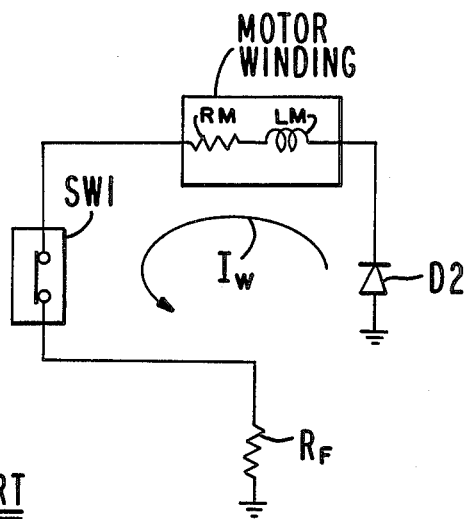
FIG. 3 is a schematic circuit diagram of a portion of the circuit of FIG. 1 depicting current flow during current decay in the motor winding.
Figure 4:
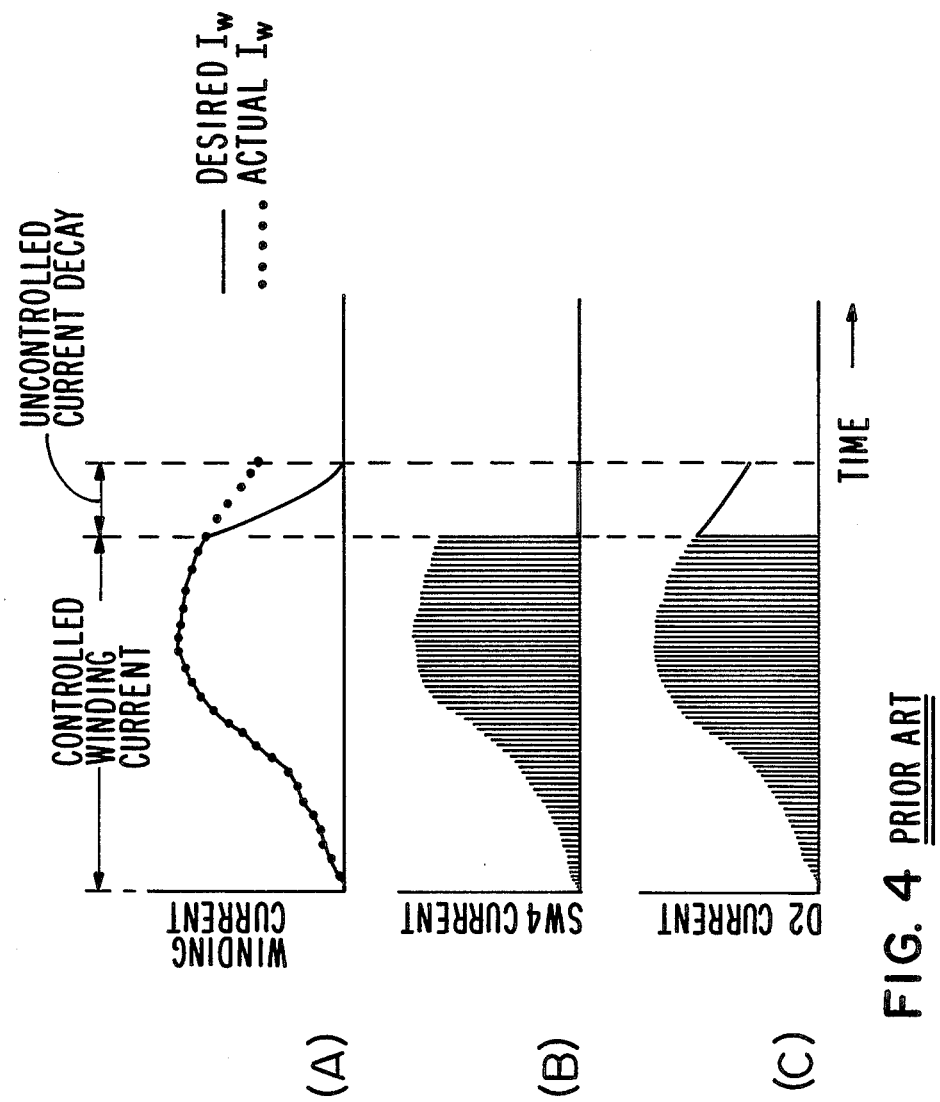
FIG. 4 is a plot of various waveforms encountered in the prior art current of FIG. 1.
Figure 5:
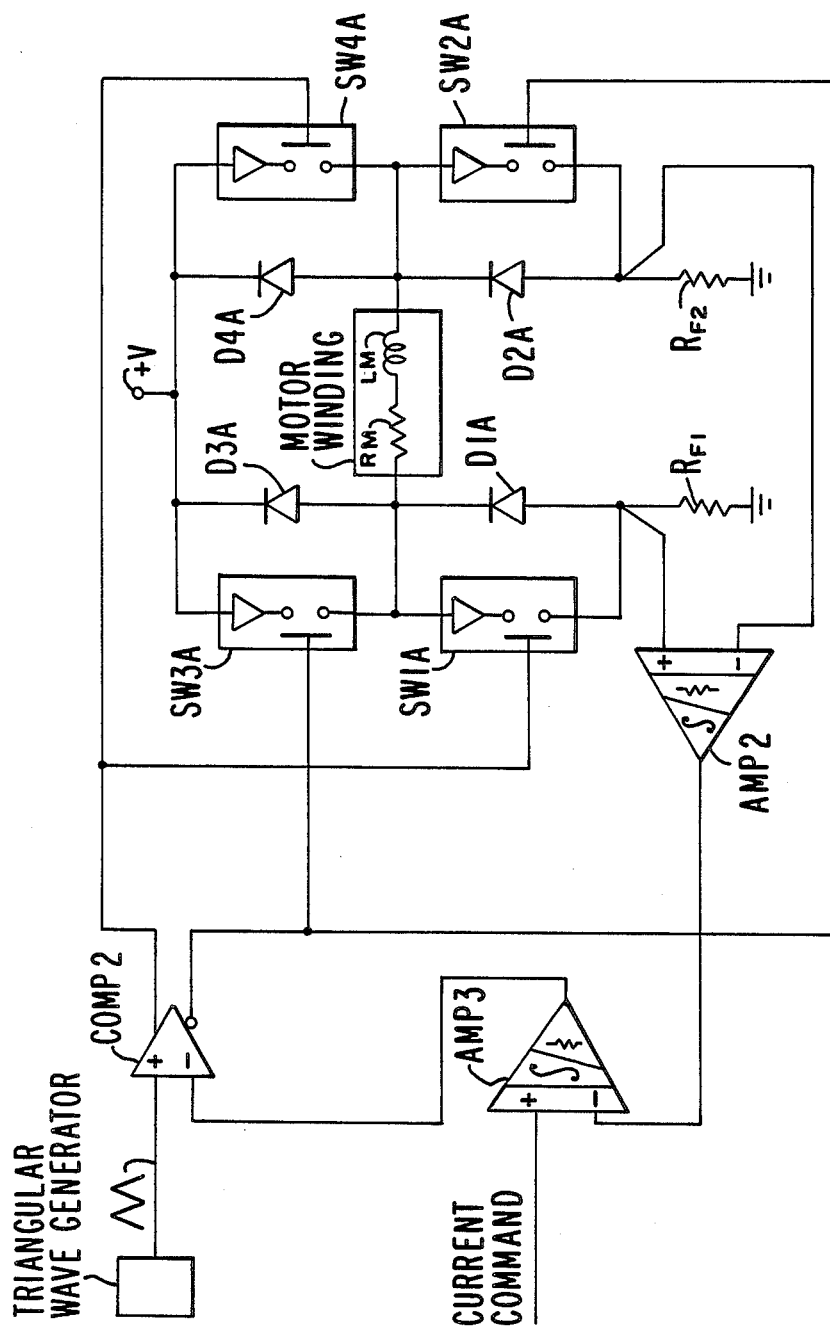
FIG. 5 is a schematic circuit diagram, partly in block diagram form, of an alternative prior art motor-driver circuit.
Figure 6:
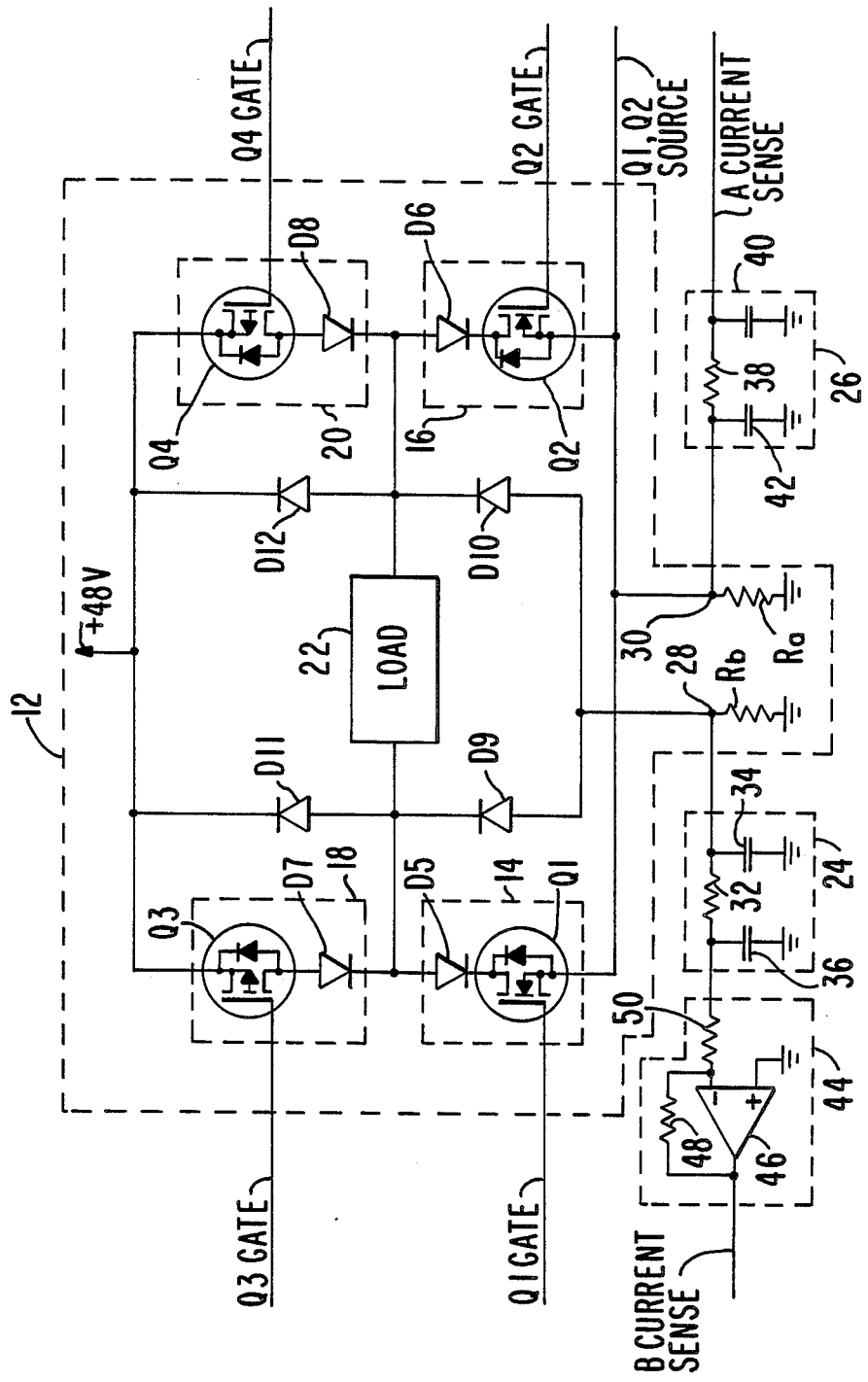
FIG. 6 is a schematic circuit diagram, of a portion of a motor-winding driver circuit incorporating features of the present invention.

Referring now to FIG. 6, there is shown an H bridge motor driver circuit 12 of the present invention. Bridge 12 comprises four switches 14, 16, 18, 20. Switch 14 comprises an N-channel MOSFET Q1 and a diode D5 which prevents the built-in diode of MOSFET Q1 from conducting. Similarly, switch 16 comprises a N-channel MOSFET Q2 and a diode D6. Switch 18 comprises a P-channel MOSFET Q3 and a diode D7. Switch 20 comprises a P-channel MOSFET Q4 and a diode D8.

The top terminals of switches 18 and 20 are connected to a +48 V power supply. Diodes D11 and D12 are connected across swithes 18 and 20 respectively. Diodes D9 and D10 have their cathodes connected to the top terminals of switches 14 and 16 respectively. The anodes of diodes D9 and D10 are joined together and connected to ground by way of a current-sensing resistor Rb. The lower terminals of switches 14 and 16 are joined together and connected to ground by way of a second current sensing resistor Ra. Driver 12 drives a load 22 which includes a motor winding and discrete inductors, resistors, and capacitors (not shown) whose function is to prevent high frequency switching signals and harmonics from reaching the load, where they would otherwise radiate to other sensitive circuits nearby.

Integrators 24 and 26 connected across resistors Ra and Rb are used to smooth the current sense feedback voltage at terminals 28 and 30 respectively. Integrator 24 comprises a resistor 32 and capacitors 34 and 36. Integrator 26 comprises a resistor 38 and capacitors 40 and 42. The signal at the output of integrator 24 is inverted by an inverting amplifier 44 comprising an operational amplifier 46 and resistors 48 and 50. The output of inverting amplifier 44 is labeled B CURRENT SENSE and the output of integrator 26 is labeled A CURRENT SENSE.

Figure 7:
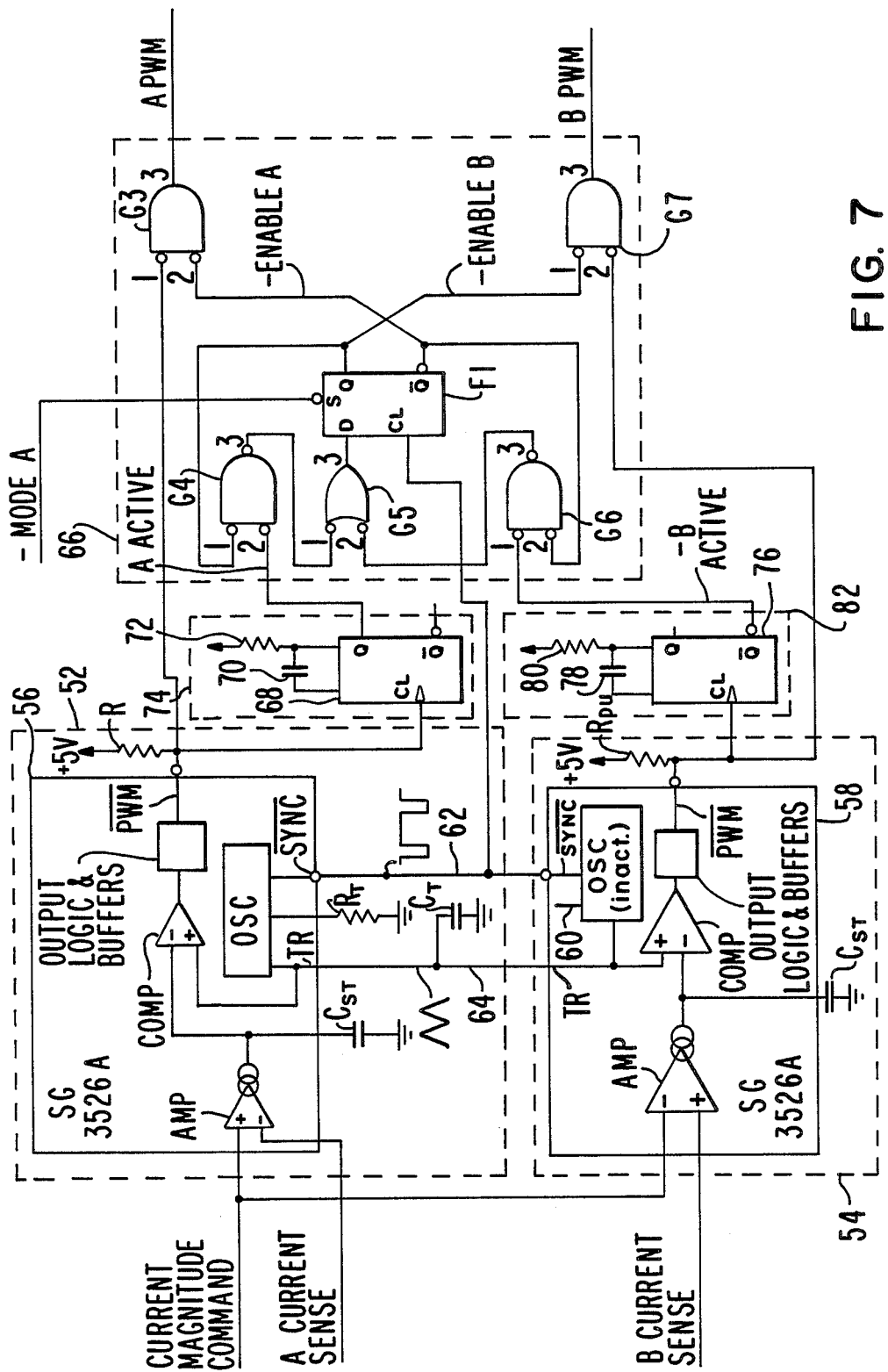
FIG. 7 is a schematic circuit diagram, parlty in block diagram form, of pulse width modulators and mediation circuit portions of the motor-winding driver circuit of the present invention.

Referring now to FIG. 7, there are shown two regulating pulse width modulators 52 and 54 for modulating the switches 14, 16, 18 and 20, each of which comprises an SG3526A-type integrated circuit (ICs) 56 and 58 respectively, produced by Silicon General Corp. and shown in simplified form. Each pulse width modulator IC comprises the following blocks:

a current feedback amplifier AMP requiring an external capacitor Cst for stability and having a current source-type output stage;

an oscillator OSC which generates a triangular waveform at the TR terminal and a rectangular waveform at the negative SYNC terminal when an external timing capacitor Ct and a resistor Rt are connected;

a comparator COMP compares the output signal of amplifier AMP with the triangular waveform generated by oscillator OSC;

an OUTPUT LOGIC & BUFFERS block buffers the output of comparator COMP and produces a pulse width modulating signal at the negative PWM terminal when an external pull-up resistor Rpu is connected between that terminal and a +5 V power supply.

The values of external timing resistor Rt and capacitor Ct connected to the terminals of IC 56 are such that the frequency of the triangular waveform produced by oscillator OSC of IC 56 is 250 KHz. An external timing resistor is not connected to terminal 60 of IC 58 causing its oscillator OSC to be inactive. IC 58 is connected to IC 56 by way of conductors 62 and 64 resulting in the operation of IC 58 being driven by the triangular and rectangular waveforms produced by oscillator OSC of IC 56.

Amplifier AMP of IC 56 amplifies the difference between the control signal CURRENT MAGNITUDE COMMAND and the A CURRENT SENSE signal and amplifier AMP of IC 58 amplifies the difference between the control signal CURRENT MAGNITUDE COMMAND and the B CURRENT SENSE signal.

The negative PWM output of IC 56 is connected to input 1 of a NOR gate G3 of a mediation logic unit 66 and to the clock CL input of a retriggerable monostable multivibrator 68 of an activity sensor 74. The negative PWM output of IC 58 is connected to input 2 of a NOR gate G7 of the mediation logic unit 66 and to the clock CL input of a retriggerable monostable multivibrator 76 of an activity sensor 82. Monostable multivibrators 68 and 76 are 74LS123-type ICs produced by Texas Instruments, Inc. Resistor 72 and capacitor 70 program the pulse time of multivibrator 68 to 40 microseconds or 10 periods of the PWM output signal of IC 56. Resistor 80 and capacitor 78 program the pulse time of multivibrator 76 to 40 microseconds as well.

The mediation logic unit 66 comprises NOR gates G3 and G7, NAND gates G4, G5, and G6, and a D flip-flop F1. Input 2 of gate G4 is connected to the Q output of multivibrator 68 of activity sensor 74 and input 1 of gate G6 is connected to the negative Q output of multivibrator 76 of activity sensor 82. The S-bar input of flip-flop F1 is connected to control signal −MODE A. The output signal of gate G3 is labeled A PWM and the output signal of gate G7 is labeled B PWM and serve as inputs to a polarity logic unit of FIG. 8.

Figure 8:
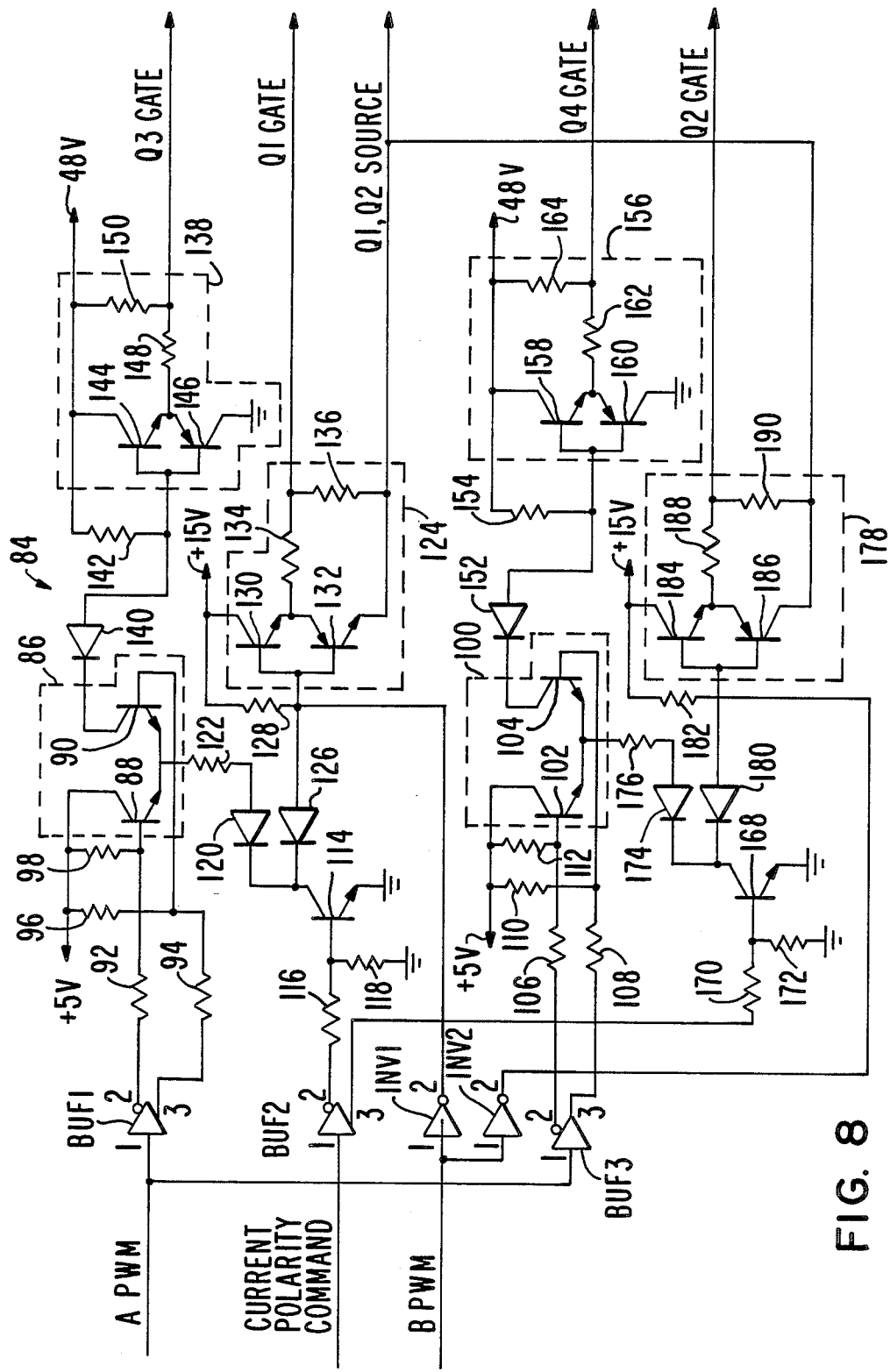
FIG. 8 is a schematic circuit diagram of a current polarity logic circuit portion of the driver circuit of the present invention.

Referring now to FIG. 8, there is shown a current polarity logic unit 84 which controls switches 14, 16, 18, and 20 of driver 12 in accordance with the truth table shown in FIG. 9. The A PWM signal buffered by a dual polarity buffer BUF1 controls a differential transistor pair 86 comprising transistors 88 and 90 by way of resistors 92, 94, 96, and 98. Transistor pair 86 control a buffer 138 by way of a diode 140 and a resistor 142. Buffer 138 comprises transistors 144 and 146 and resistors 148 and 150. It controls switch 18 of bridge 12 by way of conductor Q3 GATE. The A PWM signal buffered by a dual polarity buffer BUF3 controls a differential transistor pair 100 comprising transistors 102 and 104 by way of resistors 106, 108, 110, and 112. Transistor pair 100 controls buffer 156 by way of a diode 152 and a resistor 154. Buffer 156 comprises transistors 158 and 160 and resistors 162 and 164. Its output controls switch 20 of bridge 12 by way of conductor Q4 GATE.

The control signal CURRENT POLARITY COMMAND for controlling the direction of current in the motor winding 22 is buffered by a dual polarity buffer BUF2 whose negative output 2 controls transistor 114 by way of resistors 116 and 118. Transistor 114 controls the current of the differential transistor pair 86 by way of a diode 120 and a resistor 122. In addition, transistor 114 controls a buffer 124 by way of a diode 126 and a resistor 128. Buffer 124 comprises transistors 130 and 132 and resistors 134 and 136 and controls switch 14 of driver 12 by way of conductors Q1 GATE and Q1, Q2 SOURCE.

The positive output 3 of buffer BUF2 controls a transistor 168 by way of resistors 170 and 172. Transistor 168 controls the current of differential transistor pair 100 by way of a diode 174 and a resistor 176. In addition, transistor 168 controls buffer 178 by way of a diode 180 and a resistor 182. Buffer 178 comprises transistors 184 and 186 and resistors 188 and 190 and controls switch 16 of driver 12 by way of conductors Q2 GATE and Q1, Q2 SOURCE.

OPERATION OF THE APPARATUS OF THE INVENTION

Figure 10:
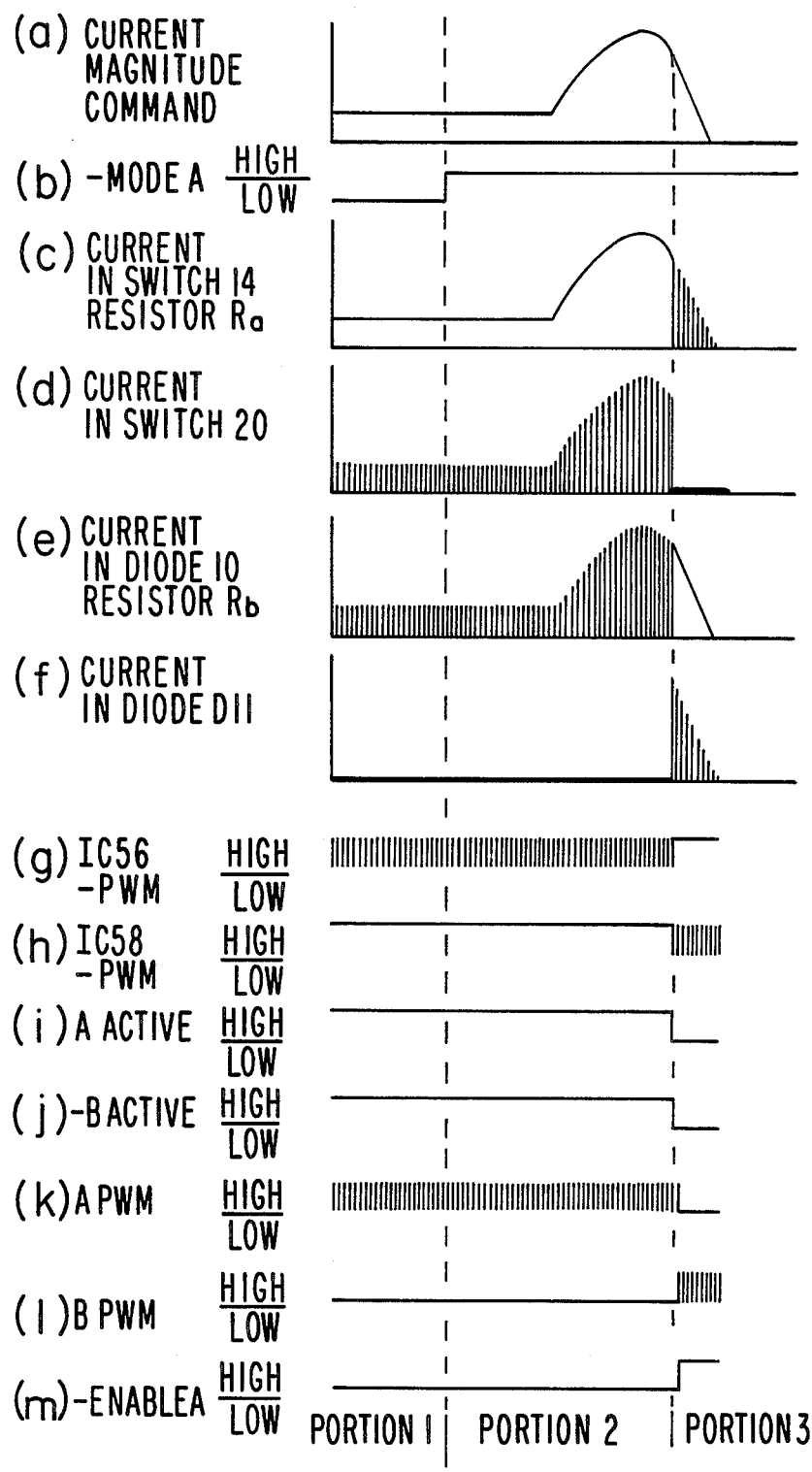
FIG. 10 is a plot of various waveforms encountered in the motor-driver circuit of the present invention.

Referring now to FIG. 10, the operation of the motor-driver circuit of the present invention is described. To achieve current flow in load 22 from right to left, the control signal CURRENT POLARITY COMMAND to BUF2 of FIG. 8 is set "high" to turn switches 18 and 16 off. FIG. 10a shows the desired winding current whose magnitude is commanded by the voltage levels of the control signal CURRENT MAGNITUDE COMMAND to the pulse width modulators 52 and 54. Initially, the desired winding current is constant (portion 1 of FIG. 10a) and the conventional mode of PWM current control (further referred to as mode A) is set by a "low" value of the control signal, −MODE A fed to flip-flop F1 of FIG. 7 (portion 1 of FIG. 10b). In MODE A, lower left hand switch 14 of driver 12 is on and pulse width modulation is applied to upper-right hand switch 20. As a result, winding current continuously flows through switch 14 and resistor Ra (portion 1 of FIG. 10c) and the source of winding current flow alternates between switch 20 (portion 1 of FIG. 10d) and diode D10 (portion 1 of FIG. 10e). The PWM signal for switch 20 is supplied by pulse width modulator 52 (portion 1 of FIG. 10g) by way of gate G3 of mediation logic 66 (portion 1 of FIG. 10k) through current polarity logic 84 as output Q4 GATE. The winding current is sensed at node 30 by resistor Ra and fed to the amplifier AMP of pulse width modulator 52 by way of integrator 26 and conductor A CURRENT SENSE.

The control signal −MODE A is then set "high" thereby enabling mediation logic 66 to mediate between modulation mode A and mode B which will be described later. In mode B the modulation signal is supplied by pulse width modulator 54. The purpose of mediation logic 66 is to keep the apparatus in whatever mode it is in so long as the winding current is being controlled and to switch to the other mode when control fails. Failure to control current is indicated by the disappearance of pulses on the negative PWM output of the pulse width modulator IC (56 or 58) currently selected to control current. Loss of control is sensed by activity sensors 74 and 82. When IC 56 is producing pulses on its negative PWM output, it keeps retriggering monostable multivibrator 68 of activity sensor 74 thereby keeping its A ACTIVE output signal "high" and when these pulses disappear, the A ACTIVE signal becomes "low". When IC 58 is producing pulses on its negative PWM output, it keeps retriggering monostable multivibrator 76 of activity sensor 82 thereby keeping its negative B ACTIVE output signal "low" and when these pulses disappear, the negative B ACTIVE signal becomes "high". The selected current modulation mode, A PWM or B PWM, is determined by the state of flip-flop F1 of the mediation circuit 66 of FIG. 8. When the Q output of flip-flop F1 is "high" the apparatus is in mode A and when that output is "low" the apparatus is in mode B. The truth table of mediation logic 66 is shown in Fig. 11.

The motor driver circuit of the present invention controls winding current through the current build-up stage and the initial part of the current decay stage of the current command waveform, FIG. 10a, by staying in mode A as illustrated in portion 2 of FIGS. 10a-m. When the commanded rate of current decay exceeds the natural rate of decay obtained by turning off switch 20, (portion 3 of FIG. 10a), the level of the feedback signal A CURRENT SENSE on the negative input of amplifier AMP of IC 56 exceeds that of the control signal CURRENT MAGNITUDE COMMAND on the positive input of that amplifier, and as a result pulses disappear from the negative PWM output of IC 56 (portion 3 of FIG. 10g) causing the A ACTIVE output signal of activity sensor 74 to switch to a "low" value. At this time winding current is continuously flowing through the current sense resistor Rb (portion 3 of FIG. 103) and as a result the level of current sensed, signal B CURRENT SENSE on the positive input of amplifier AMP of IC 58 exceeds that of the control signal CURRENT MAGNITUDE COMMAND on the negative input of that amplifier, and consequently pulses appear on the negative PWM output of IC 58 (portion 3 of FIG. 10h) causing the A ACTIVE output signal of activity sensor 82 to switch to a "low" value. As a result, mediation logic 66 changes states (portion 3 of FIG. 10m) and the mediation circuit 66 selects modulation mode B.

In mode B, switch 20 is off and pulse width modulation is applied to switch 14. As a result, "free wheeling" or circulatory winding current continuously flows through diode D10 and resistor Rb (portion 3 of FIG. 10e) and alternately switches paths through switch 14 (portion 3 of FIG. 10c) and the path through diode D11, power supply, +48 V in the reverse direction, ground, and resistor Rb. (portion 3 of FIG. 10f). The PWM signal for switch 14 is supplied by pulse width modulator 58 (portion 3 of FIG. 10b) through current polarity logic 84. The winding current is sensed by resistor Rb, as B CURRENT SENSE and compared with the CURRENT MAGNITUDE COMMAND in pulse width modulator 54 to derive the B PWM output fed to switch 14.

As thus far described, the motor winding control circuit of the present invention has been limited to unidirectional current flow through the motor winding 22. While unidirectional current flow has certain applications, other applications require bidirectional current flow and control thereof.

The circuit of the present invention provides bidirectional control over the current flow in the winding 22 by following the truth table of FIG. 9 and using all four switches in the bridge of FIG. 6. More particularly, switches 14 and 20 are used to control winding current flow in one direction, whereas switches 16 and 18 are used to control winding current flow in the opposite direction.

Thus, the present invention provides a four-switch motor winding current driver for precise control of motor winding current during rapid current decay as well as during current build-up. In addition, the current driver of the present invention has bidirectional current flow through the power supply only during rapidly decaying portions of the winding waveform, resulting in operation characterized by lower levels of EMI and higher efficiency.

Figure 12:
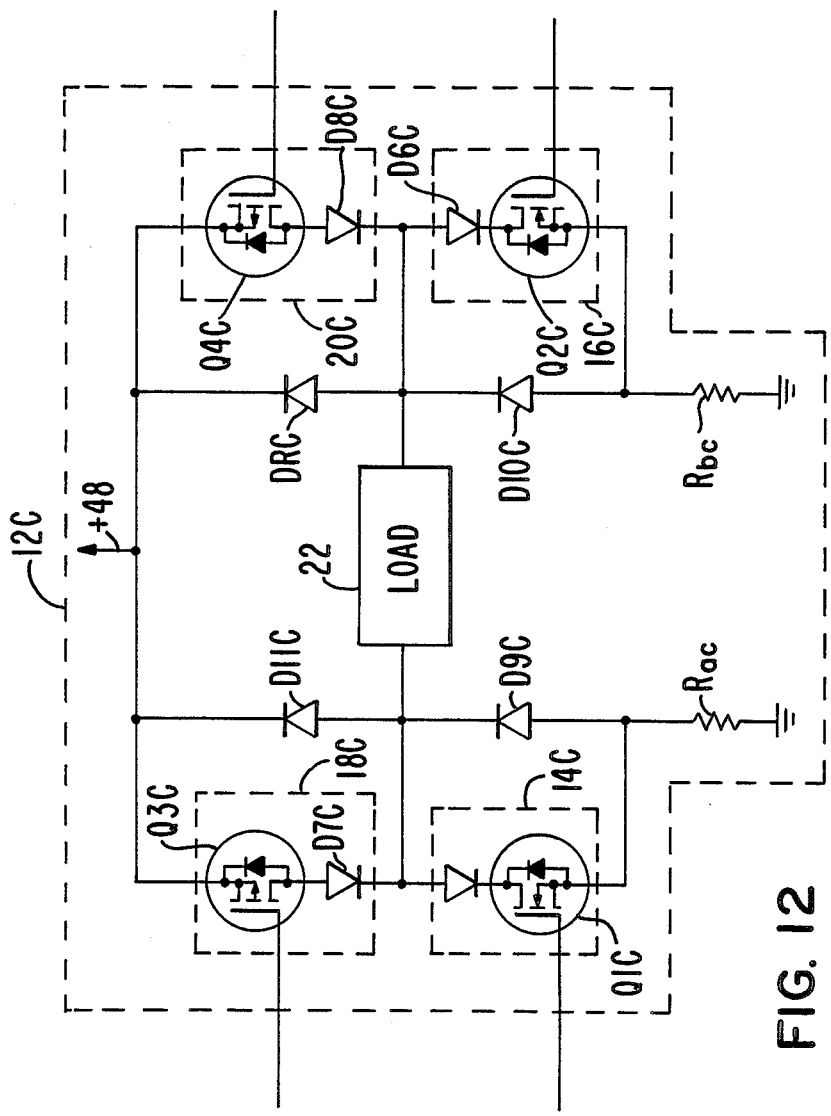
FIG. 12 is a circuit design similar to that of FIG. 6 depicting an alternative embodiment of the present invention.

While the above description of the invention contains many specificities, these should not be construed as limitations on the scope of the invention, but rather, as an example of one preferred embodiment thereof. For example, referring now to FIG. 12, the location of the current sensing resistors Ra and Rb could be changed to that of resistors Rac and Rbc of driver 12c, which is another embodiment of driver 12. Each of the resistors Rac and Rbc would be used to sense either switch current or diode current depending on the winding current direction.

Figure 13:
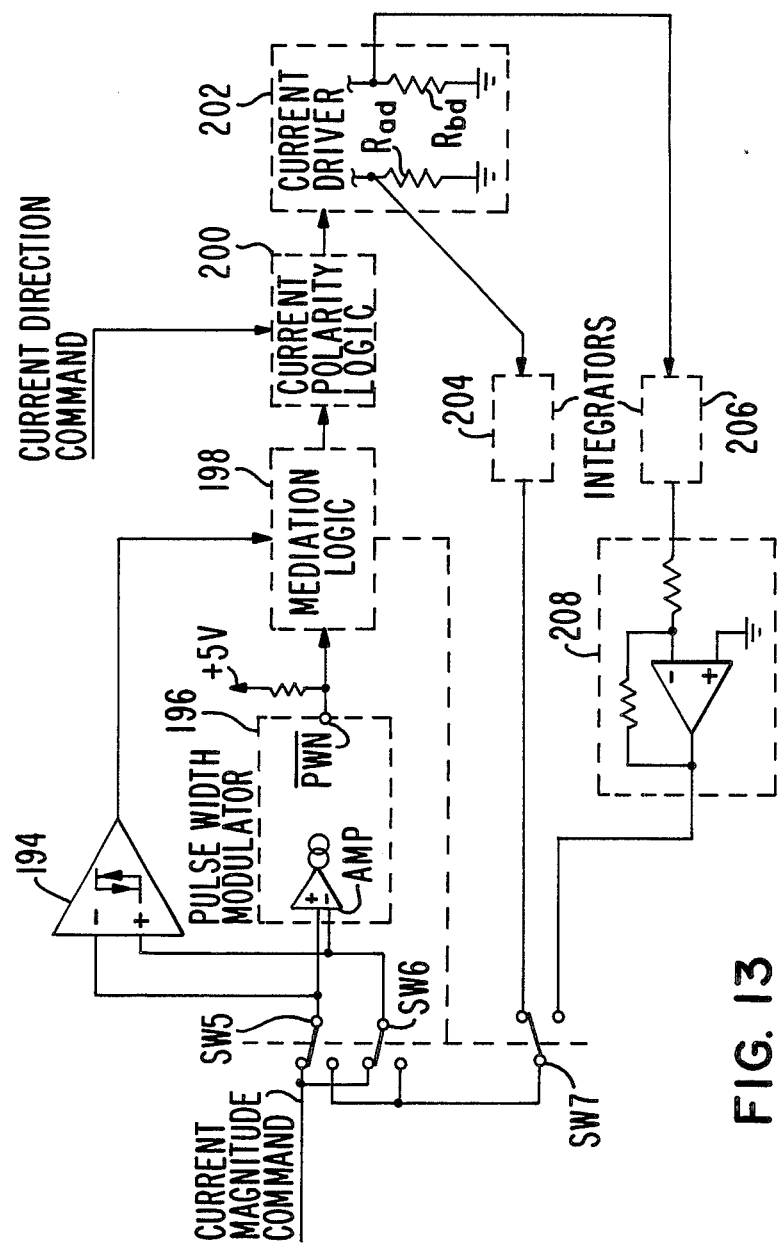
FIG. 13 is a circuit diagram, partly in block diagram form, of an alternative embodiment of the present invention.

Another alternative embodiment is shown in block diagram form in FIG. 13. There only one pulse width modulator 196 is used. To switch between modes A and B, a comparator with hystersis 194 is added. Whenever the voltage on the positive input of amplifier AMP of pulse width modulator 196 exceeds that on its negative input by the hysteresis voltage indicating failure to control winding current, the output of comparator 194 to change the sensed current feedback source from one current driver feedback resistor to another by toggling switches SW5, SW6, and SW7.

What is claimed is:

1. In a method for controlling the flow of current in an inductive load to cause the current to follow a certain command waveform having a rapidly decaying portion, comprising the steps of:

connecting the inductive load across a power supply for flow of current through the inductive load in a first direction;

connecting first and second current modulators in series with said inductive load and on opposite sides of said load, for modulating the flow of current through the inductive load;

connecting a first diode in parallel with the series connection of the inductive load and said second current modulator, and in reverse polarity to the first direction of current flow, for allowing the current to circulate through the inductive load and the second current modulator in the first direction when the current flow to the inductive load from the power supply is interrupted by said first current modulator;

connecting a second diode in parallel with the series connection of the inductive load and said first current modulator, and in reverse polarity to the first direction of the current flow, for allowing the current to circulate through the inductive load in the first direction, and through the power supply and the first diode in the opposite direction, when the current is interrupted by both said first and second current modulators, whereby the circulating current in said inductive load is caused to decay rapidly;

sensing the flow of current through said second current modulator;

sensing the flow of current through said first diode;

comparing the sensed currents with the command waveform to derive an error signal;

controlling said first current modulator in response to the error signal, derived from the comparison of the sensed current flow through said second current modulator so as to cause the modulating current to follow the command waveform;

sensing loss of current control when the first current modulator can no longer cause the current through the inductive load to decay rapidly enough to follow the decaying portion of the command waveform; and cutting off the current flow through both of said first and second current modulators in response to sensing loss of current control, to cause the current to circulate through the power supply in the opposite direction, and through the inductive load in the first direction, whereby the current in the inductive load in the first direction is caused to decay rapidly.

2. The method of claim 1 wherein said first current modulator pulse width modulates the current flow therethrough in response to the error signal.

3. The method of claim 1 wherein the step of cutting off the current flow through both of said first and second current modulators includes cutting off the current flow through said first current modulator while cyclically interrupting the current flow through said second modulator in response to the error signal derived from a comparison of the sensed flow of current through said first diode.

4. The method of claim 1 wherein said second current modulator pulse width modulates the current flow therethrough in response to the error signal.

5. The method of claim 1 wherein the step of sensing loss of current control comprises sensing a loss of modulation of the current flow through the inductive load.

6. The method of claim 1 wherein the inductive load comprises a winding of a motor.

7. In a motor-drive circuit for causing the current in the motor winding to follow a certain command waveform having a rapidly decaying portion comprising current supply means for supplying a flow of current in a first direction;

a motor winding connected across said current supply means for flow of current from said current supply means through said motor winding for driving said motor;

first and second current modulator means connected in series with said motor winding and on opposite side of said winding for modulating the flow of current through said winding;

a first diode means connected in parallel with the series connection of said motor winding and said second current modulator means, and in reverse polarity to said first direction of current flow, for allowing current to circulate through said motor winding and said second current modulator means in the first direction when the current flow to said motor winding from said power supply means is interrupted by said first current modulator means;

a second diode means connected in parallel with the series connection of said motor winding and said first current modulator means and in reverse polarity to the first direction of current flow for allowing the current to circulate through said motor winding in the first direction, and through said power supply means and said first diode means in the opposite direction, when the current is interrupted by both said first and second current modulator means, whereby the circulating current in said motor winding is caused to decay rapidly;

first sensing means for sensing the flow of current through said second current modulator means to derive a first sensed output;

comparator means for comparing said first sensed current output with the command waveform to derive a first error signal output;

said first current modulator means being responsive to said first error signal output, for causing the current flowing through said motor winding and said second current modulator means to follow the command waveform;

control sensing means including means for sensing loss of control over the current in said motor winding and means for producing a loss of control output when said first current modulator means can no longer cause the current through said motor winding, to decay rapidly enough to follow the rapidly decaying portion of the command waveform; and said second current modulator means being responsive to said loss of control output, for modulating current flow therethrough and for causing current to circulate through said motor winding in the first direction, through said second diode, power supply means, and first diode means in the opposite direction, and to cause the circulating current in said motor winding to decay rapidly.

8. The motor driver circuit of claim 7 including:

second sensing means for sensing the flow of current through said first diode means to derive a second sensing output;

comparator means for comparing the command waveform with the second sensing output to derive a second error signal; and said second current modulator means being responsive to said second error signal for modulating the current flow therethrough so as to cause the current flow through said motor winding to follow the command waveform in the rapidly decaying portion thereof.

9. The motor drive circuit of claim 7 wherein said first and second current modulator means are pulse width modulators.

10. The motor drive circuit of claim 7 wherein said control sensing means further includes an activity sensor means for sensing the current modulation produced by said first current modulator means, and when the sensed current modulation drops below a certain threshold level said activity sensor means produces the loss of control output.

* * * * *